May 23, 1950     W. F. FELL     2,508,665
GENERATION SYSTEM
Filed Oct. 4, 1946
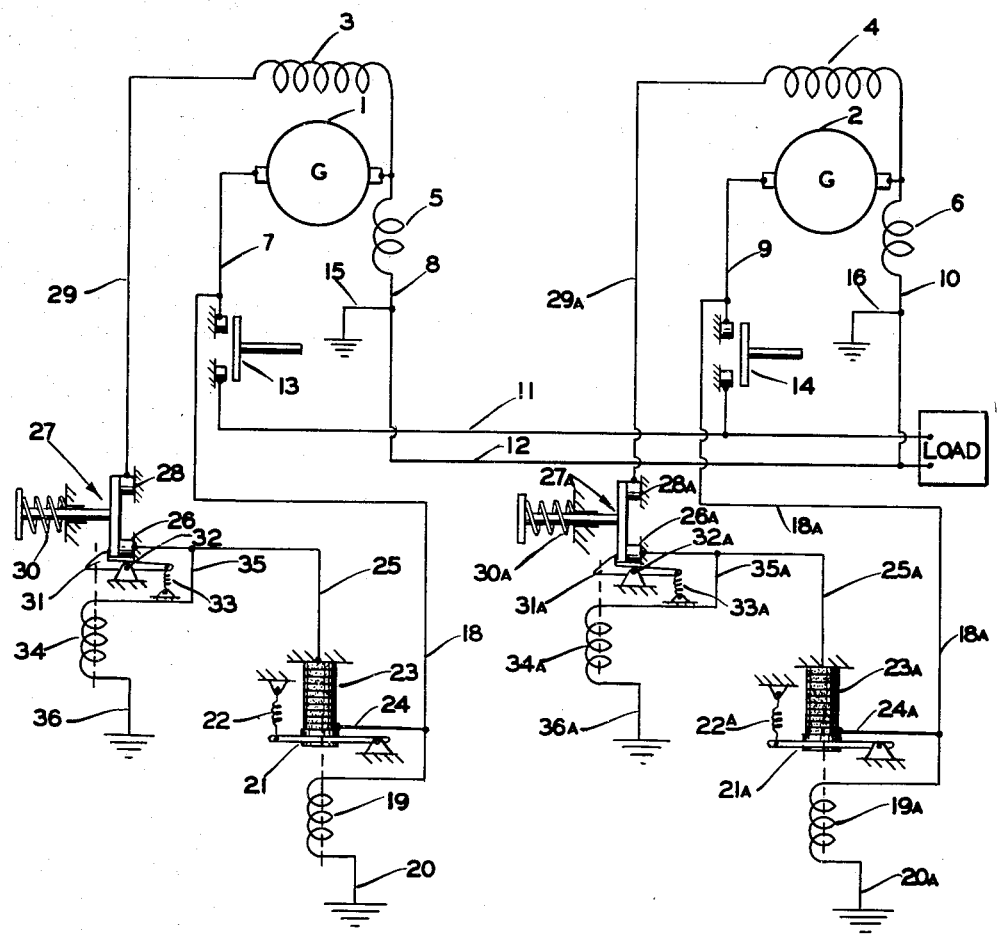
INVENTOR
WILLIAM F. FELL
BY
ATTORNEY Patented May 23, 1950

2,508,665

UNITED STATES PATENT OFFICE 2,508,665

GENERATION SYSTEM

William Francis Fell, Hasbrouck Heights, N. J., assignor to Bendix Aviation Corporation, Teterboro, N. J., a corporation of Delaware Application October 4, 1946, Serial No. 701,266

6 Claims. (Cl. 171—119)

REISSUED
APR 2 1951
RE 23355

The present invention relates to electrical generator systems and more particularly to a system for effecting protection from excessive output voltage in the event of a short circuit in the regulator.

Heretofore, in conventional generator systems, if the potential coil of a carbon pile regulator for one of the generators should open or a short should occur across the carbon pile, there would occur an abnormal increase in the generator field current and hence an undesired increase in the output voltage.

An object of the present invention is to provide novel means effective for opening the generator field circuit in the event either of the aforenoted faults should occur.

Another object of the invention is to provide a novel system in which a circuit breaker opens the field circuit of the generator in response to an increase in the generator field current above a predetermined safe value, whereupon the voltage produced by this generator drops rapidly to zero.

Thus in the present system only the faulted generator ceases generating, whereas formerly in the conventional systems all the generators on the line would cease generating when any generator was faulted.

In the former system, when the output of one generator rose excessively in voltage, this would in turn cause the line voltage to increase to a value above the setting for line voltage circuit breakers for the other generators, whereupon the latter generators would in turn drop out. In the present invention, when one generator in the system is faulted, as described, and its field current rises, the regulators of the other generators tend to hold down the rise in line voltage for an appreciable length of time until the circuit breaker in the field circuit of the faulted generator opens.

An object of the present invention, therefore, is to provide an improved system for opening the field circuit of any one of the line generators when the field current rises above a predetermined value, so as to avoid the difficulties aforenoted.

These and other objects and features of the invention are pointed out in the following description in terms of the embodiment thereof which is shown in the accompanying drawing. It is to be understood, however, that the drawing is for the purpose of illustration only, and is not designed as a definition of the limits of the invention, reference being had to the appended claims for this purpose.

The drawing is a schematic view of a generator system embodying the present invention.

Referring to the drawing, there is indicated by numerals 1 and 2 a pair of generators having field windings 3 and 4, respectively, and compensating field windings 5 and 6. The generators 1 and 2 may be of a conventional type and are connected through output lines 7 and 8, 9 and 10, respectively, to the main output lines 11 and 12.

Controlling the output line 7 of the generator 1 is a line switch 13 which may be of any suitable type and controlling output line 9 of the generator 2 is a line switch 14, which likewise may be of any suitable type.

The output line 8 of the generator 1 is grounded through connection 15 while the output line 10 of the generator 2 is grounded through connection 16.

Leading from the output line 7 of the generator 1 is a line 18 which is connected to a potential coil 19 grounded at 20 and thus connected across the output lines 7 and 8 of the generator 1.

The potential coil 19 controls an armature 21 biased under tension of a spring 22 so as to tend to compress a carbon pile 23 and thereby regulate the resistance of the pile 23 in a conventional manner.

The carbon pile 23 is preferably of a type such as shown in the copending application Serial No. 612,691, filed August 25, 1945, by William G. Neild, now U. S. Patent No. 2,481,771.

The carbon pile 23 is connected by a conductor 24 at one end to the line 18, while the opposite end of the carbon pile 23 is connected through a conductor 25 leading to a terminal 26 of a circuit breaker 27. An opposite terminal 28 of the circuit breaker 27 is connected by a conductor 29 to the field 3 of the generator 1. Thus with the circuit breaker 27 in the closed position as shown, it will be seen that the carbon pile 23 will regulate the field 3 of the generator 1 in response to the output voltage across the lines 7 and 8 in the conventional manner.

The circuit breaker 27, however, is biased under tension of a spring 30 in an opening direction and is held from opening by a latch 31 pivoted at 32 under tension of a spring 33 in a normal locking relation to the circuit breaker 27, and thereby holding the same in a circuit closing position. The latch 31 is controlled by electromagnetic winding 34 which is connected through conductor 35 to the line 25 and through a grounded connection 36 and circuit breaker 27 across the field windings 3 and 5 of the generator 1.

Thus upon the field current through the winding 3 increasing above a predetermined maximum safe value effecting a corresponding increase in the voltage drop or fall of potential across the field winding 3, the electromagnet 34 will bias the latch 31 in a counterclockwise direction permitting the circuit breaker 27 under tension of the spring 30 to move to a circuit opening position, whereupon the current flow through the field winding 3 will cease and the voltage produced by the generator 1 will drop rapidly to zero. Such excess current flow may well occur upon either a shortage across the carbon pile regulator 23 or upon a short of the coil 19 causing an abnormal increase in the generator field current so as to cause in turn sufficient energization of the circuit breaker winding 34 to effect opening of the circuit breaker 27, whereupon the voltage produced by the generator will drop rapidly to zero.

A similar safety provision is provided for the generator 2 in which like numerals having applied thereto the letter A, indicate corresponding parts to those described with reference to the generator 1. While only two generators are shown, any desired number of generators may be employed in the system.

It will be seen from the foregoing that there has been provided a novel means for preventing over-voltage upon failure of either the carbon pile regulator or the control coil therefor.

Although only one embodiment of the invention has been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. In combination, a load circuit, a plurality of generators, each of said generators having an output to said load circuit, each of said generators having a field circuit including a field winding, a regulator associated with each of said field circuits, a control winding for each of said regulators and connected across the output of its associated generator, a switch connected in the field circuit of each generator and control means for each of said switches including a winding connected across the field winding of the associated generator and effective upon a rise in the voltage drop across the field winding above a predetermined safe value to open said switch and thereby its associated field circuit, while the regulator of the other of said generators tends to maintain the voltage drop across the field winding of its associated generator below the predetermined safe value.

2. In combination, a load circuit, a plurality of generators for said load circuit, each of said generators having a field circuit including a field winding, a regulator associated with each of said field circuits, a control winding for each of said regulators and connected across the output of its associated generator, a switch connected in the field circuit of each generator, and control means for each of said switches including spring means for biasing the switch in a circuit opening direction, latch means for locking the switch in a field circuit closing position, and an electromagnetic winding connected across the field winding of the associated generator and effective upon a rise in the voltage drop across the field winding above a predetermined safe value to bias said latch means so as to permit said spring means to actuate said switch to a field circuit open position while the switch of the other of said generators remains in the field circuit closing position, and the regulator of the other of said generators tends to maintain the voltage drop across the field winding of its associated generator below said predetermined safe value.

3. In combination, a load circuit, a generator for said load circuit, a field circuit for said generator including a field winding, a regulator for said field circuit including a carbon pile electrically connected in said field circuit for controlling the excitation thereof, and an electromagnetic means for varying the resistance of said carbon pile including a control winding connected across the output of the generator, a switch connected in the field circuit of the generator, and control means for said switch including spring means for biasing the switch in a circuit opening direction, a latch for locking the switch in a field circuit closing position, and an electromagnetic winding connected across the field winding of the generator and effective upon a rise in the voltage drop across the field winding above a predetermined safe value as upon fault of the regulator to bias the latch in a direction so as to release said switch to open the field circuit.

4. In combination, a load circuit, a generator for said load circuit, a field circuit including a field winding for controlling the output of said generator, a switch connected in the field circuit of the generator and arranged to open and close the field circuit, control means for said switch including means for biasing the switch in a circuit opening direction, releasable means for locking the switch in a closed position, and an electromagnetic winding effective upon a rise in the voltage drop across the field winding above a predetermined safe value for releasing the aforenoted locking means so as to cause said switch to open the field circuit.

5. In a multiple generator system, the combination comprising a plurality of generators, associated with each of said generators a field circuit including a field winding and a regulator for said field winding; each of said regulators including a variable resistance element connected in the field circuit of the associated generator, and an electromagnetic means for varying the resistance of said element including a control winding connected across the output of the associated generator; the field circuit of each generator including a switch to control the field winding thereof, and an overvoltage coil connected across the field winding, said overvoltage coil responsive to the potential of the associated generator less the potential drop of the associated variable resistance element to operate said switch, said overvoltage coil responsive upon an increase in said operative potential above a predetermined maximum safe value to actuate its associated switch so as to open the field circuit of the associated generator and thereby prevent a faulty regulator of one generator from effecting an excessive generator output and damage to the other of said generators.

6. The combination defined by claim 5 in which the non-faulty regulator of the other of said generators may effect a predetermined output condition at said other of said generators uneffected by the faulty regulator, and means maintaining the switch of the other of said generators in a field circuit closing position irrespective of the opening of the switch of the field circuit of the one generator.

WILLIAM FRANCIS FELL.

REFERENCES CITED

The following references are of record in the file of this patent:

UNITED STATES PATENTS

| Number | Name | Date |
|---|---|---|
| 1,238,145 | Honold et al. | Aug. 28, 1917 |
| 1,766,489 | Creveling | June 24, 1930 |